July 11, 1933.    C. P. LANGDON    1,917,944
TRACTOR ATTACHMENT
Filed March 26, 1932
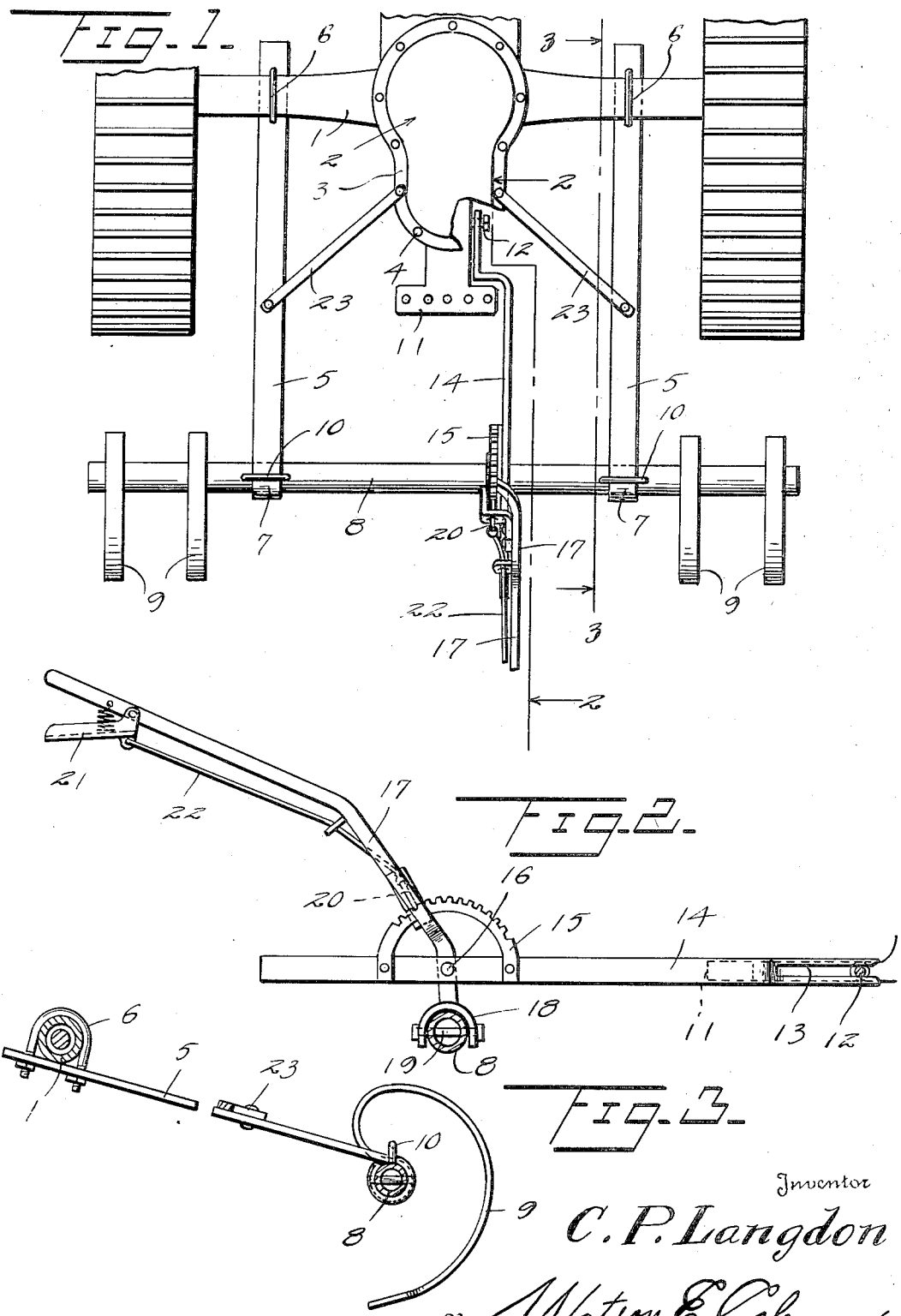
Inventor
C. P. Langdon
By Watson E. Coleman
Attorney Patented July 11, 1933

1,917,944

UNITED STATES PATENT OFFICE

CLARENCE P. LANGDON, OF HYDESVILLE, CALIFORNIA

TRACTOR ATTACHMENT

Application filed March 26, 1932. Serial No. 601,435.

This invention relates to improvements in attachments for tractors and pertains particularly to a new and novel means for attaching an agricultural implement thereto.

The primary object of the present invention is to provide an attachment for a tractor which, when the tractor is used on plowed ground, will break up the ground behind the tractor wheels and thus cultivate out the tracks formed thereby.

Another object of the invention is to provide a tractor attachment which includes a rockable implement carrying shaft which is actuated in a novel manner for the purpose of shifting the earth working implements to either operative or inoperative position.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 illustrates the device embodying the present invention, the same being shown attached to the rear axle of a tractor;

Figure 2 is a sectional view taken substantially upon the line 2—2 of Figure 1;

Figure 3 is a sectional view taken substantially upon the line 3—3 of Figure 1.

Referring now more particularly to the drawing wherein like numerals of reference indicate corresponding parts throughout the several views, the numeral 1 indicates the rear axle housing of a tractor which connects in the usual manner with the differential housing 2 which has a horizontal surrounding flange 3 which forms a part of the means for coupling upper and lower sections of the housing together, the flange or flanges being secured together by means of bolts 4.

The attachment embodying the present invention comprises a pair of beams each of which is indicated by the numeral 5 which are disposed in spaced parallel relation to extend longitudinally of the tractor with a differential housing therebetween, the forward end of the beams passing beneath the axle housing 1 and being connected therewith by a U-bolt 6. The rear ends of these beams 5 are formed to provide eyes or bearings 7 and through these bearings 7 there extends the tubular shaft 8 to which are attached the earth working implements 9. These implements are here illustrated as being in the form of spring harrow teeth but it is, of course, to be understood that implements of other types may be readily used in the same position.

The tubular shaft 8 has limited rocking movement in the bearings 7, this movement being governed by the U-shaped staples 10 which straddle the bearings and are connected to the shaft 8 in the manner illustrated in Figures 1 and 3.

At a suitable point upon the side of the differential housing of the structure, as for example, the side edge of the hitch 11, there is secured a headed stud 12. This stud slidably engages in the furcation 13 formed in one end of a bar 14 which extends rearwardly over the tubular shaft 8. Upon this bar 14 is mounted a toothed segment 15 and pivotally attached to the bear at the radial center of the segment 15, as at 16, is a hand lever 17.

The connection of the hand lever 17 with the bar 14 is at a point inwardly of the lower end of the lever and as shown the lever terminates at its lower end in a fork 18 which receives the tubular shaft 8 and is secured thereto by the bolt 19 which passes through the shaft and through the ends of the fork. The hand lever 17 is provided with the usual pawl 20 which engages between the teeth of the segment 15 and which is controlled by the pivotally mounted handle 21 and wire 22 which connects the handle with the pawl.

The beams 5 are held in the proper spaced relation and are suitably braced by means of the bars 23, one end of each of which is bolted to a beam 5, while its other end is secured to the differential housing flange 3 by means of an adjacent one of the bolts 4 of the housing. By this means the beams 5 are prevented from moving vertically.

In the operation of the present device oscillation of the tubular beam 8 is effected for shifting the implements 9 relative to the ground, by withdrawing the pawl 20 from engagement with the segment 15 and then oscillating the hand lever 17 in the proper direction. This will result in the shifting of the bar 14 upon the stud 12 which supports its bifurcated forward end, the beam 8 serving as a fulcrum and at the same time being oscillated as the bar 14 shifts. It will thus be seen that the adjusting of the earth working implements 9 may be easily and quickly effected.

Having thus described the invention, what is claimed is:—

1. An attachment for a wheeled structure, comprising a pair of draw beams each adapted to be attached at one end to an axle of a structure to extend rearwardly in spaced parallel relation therefrom, a shaft disposed transversely of and supported by said beams and mounted for oscillation thereon, a bar member having longitudinal sliding connection at one end with the body of the structure and extending transversely of the said shaft, means for oscillating said shaft comprising a lever pivotally attached adjacent one end to said bar and having the said end secured to said shaft, and earth working elements supported by said shaft.

2. An attachment of the character described for a wheeled structure, comprising a pair of spaced parallel beams each adapted to have one end secured to an axle of the structure, means for securing said beams to extend rigidly from the axle, a bearing at the other end of each of said beams, a shaft mounted in said bearings for oscillation therein, said shaft being designed to support earth working implements, a bar member having a slot extending longitudinally therein adjacent one end, a pin member carried by the wheeled structure and engaging in said slot whereby the bar may slide on the pin, a hand lever pivotally attached adjacent one end to said bar at a point over said shaft and having the said end secured to the shaft, and means for securing said lever against oscillation.

In testimony whereof I hereunto affix my signature.

CLARENCE P. LANGDON.